Sept. 5, 1961     N. L. KUSTERS ET AL     2,999,231
GROUND DETECTORS FOR ELECTRICAL DISTRIBUTION SYSTEMS
Filed June 16, 1958     2 Sheets-Sheet 2
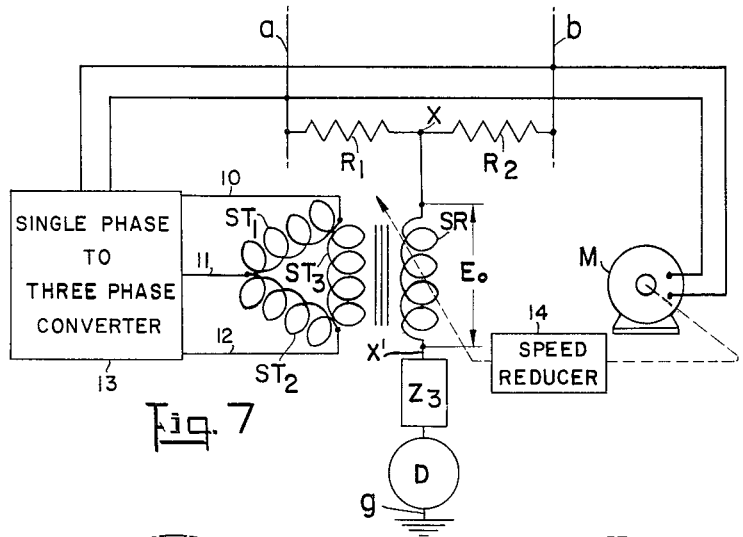
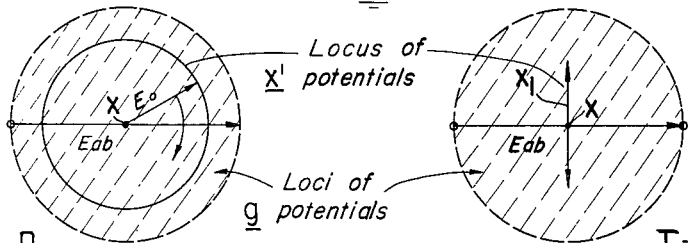
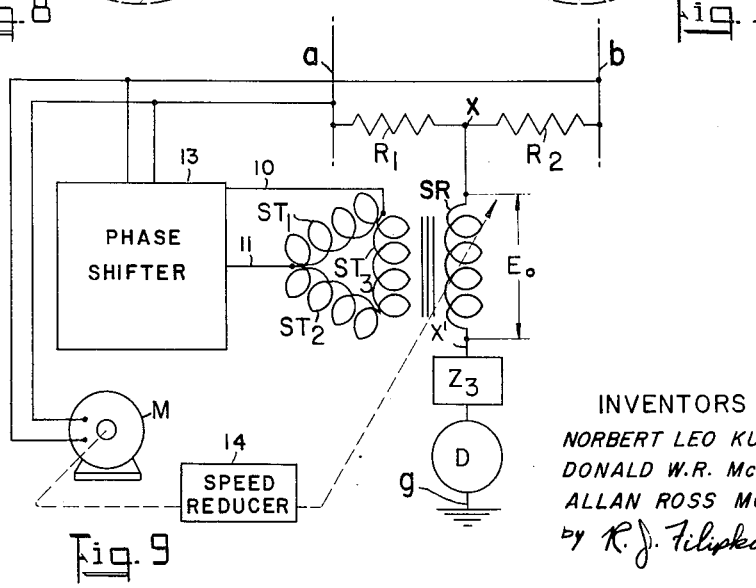
INVENTORS
NORBERT LEO KUSTERS
DONALD W.R. McKINLEY
ALLAN ROSS MORSE
by R. J. Filipkowski
AGENT

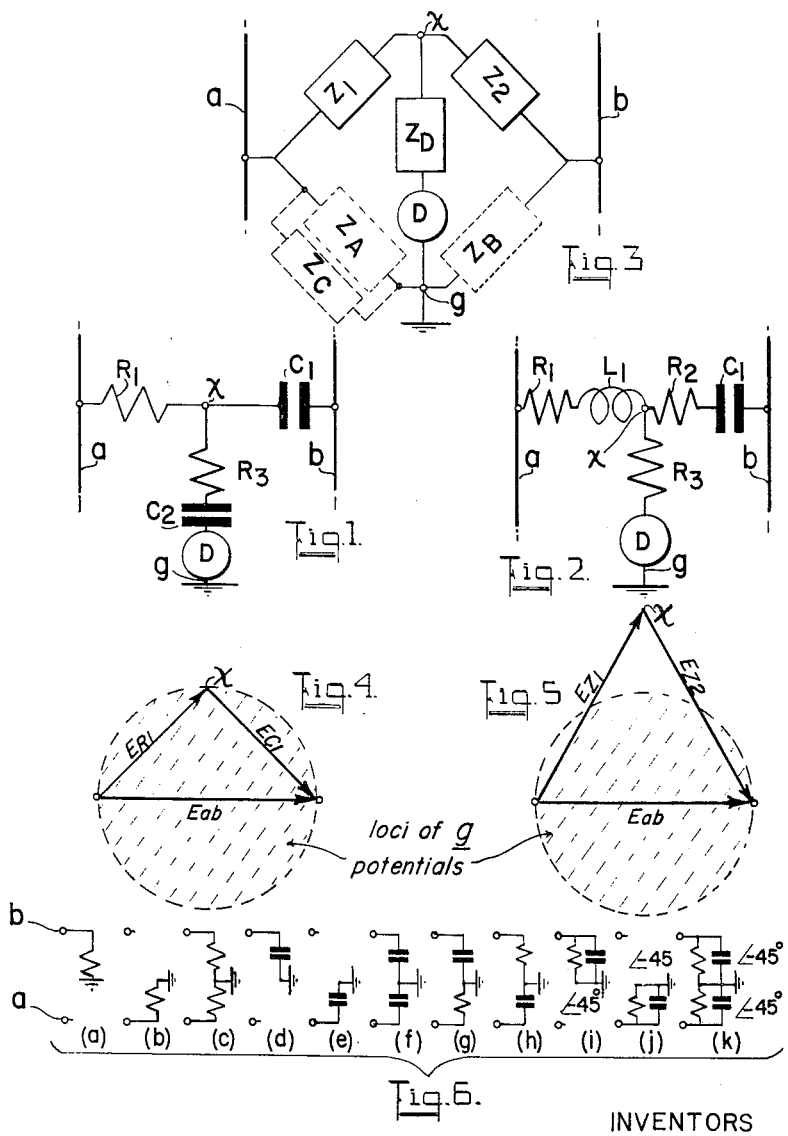

United States Patent Office 2,999,231
Patented Sept. 5, 1961

2,999,231
GROUND DETECTORS FOR ELECTRICAL
DISTRIBUTION SYSTEMS
Norbert Leo Kusters and Donald William Robert Mc-
Kinley, Ottawa, Ontario, and Allan Ross Morse, Ayl-
mer, Quebec, Canada, assignors to National Research
Council, Ottawa, Ontario, Canada, a body corporate
of Canada
Filed June 16, 1958, Ser. No. 742,340
11 Claims. (Cl. 340—255)

This invention relates to improvements in monitoring apparatus for connection between an electrical power distribution system and an extensive conductor, to give an indication whenever one or more circuits having less than a predetermined impedance become additionally connected between the system and the extensive conductor.

The invention broadly concerns the provision of sensitive apparatus for indicating the existence of faults to ground occurring on an isolated A.C. power distribution system, and is particularly concerned with providing monitoring apparatus in the form of an electrical network comprising unlike impedance elements inter-connected between the conductors of the distribution system and a detector impedance element including a current sensing device connected between a point in the network and ground, for visibly indicating or otherwise giving warning whenever an unsafe grounding condition occurs on the supply.

The National Fire Protection Association recommends the use of an ungrounded alternating current electrical distribution system in hospital operating rooms where anaesthetic is administered (NFPA No. 56, 1956). This body has recommended also that a "Ground Contact Indicator" be so arranged that a green signal lamp is displayed conspicuously so as to be visible to persons in the anaesthetizing locations and that such lamp remain lit while the system remains isolated safely from ground; if a grounding impedance of less than a predetermined value should become connected between any conductor and ground, as for example by a connection having a resistance of from zero to 10,000 ohms, a red signal lamp and an audible warning signal is required to be energized. The maximum current that may flow in a low resistance fault by virtue of the presence of the detector is specified not to exceed two milliamperes.

A typical example of a prior art ground detector for use in monitoring a two wire single phase A.C. distribution system, as described in NFPA Standard No. 56, 1956 (Appendix A-5-5) comprises a center tapped resistor connected across the line, and a larger resistor in series with a sensitive A.C. relay connected between the center tap and ground. As will be made apparent hereinafter such detector has a number of undesirable characteristics and fails to warn adequately of certain hazardous conditions, particularly balanced ground faults. Such a detector suffers from the fundamental disadvantage that symmetrical faults will remain undetected no matter how severe they may be. Symmetrical resistor faults to ground may appear unlikely but symmetrical capacitive faults are quite likely to arise inasmuch as radio interference suppression condensers are ordinarily used on equipment employed in hospital operating rooms and like areas. It may readily be shown that while all single faults, whether resistive or capacitive, on a single conductor of this system will be detected by such prior art device, it will fail completely to detect symmetrical resistive, symmetrical capacitive, or any symmetrical faults of the same or approximately the same magnitude and phase angles. In view of the fact that at 60 cycles A.C., fault currents passing through the human body of the order of two milliamperes and above are extremely irritating and since currents of the order of 10 milliamperes and higher may produce shock and possibility of death, such prior art static type of detector must be regarded as unsafe.

Applicants have therefore provided improved fault detectors of the permanently connected type for normally isolated conductors of a line wherein sensitivity to single ground faults on either conductor is achieved by employing a pair of impedances preferably of equal magnitude connected in series across the conductors of the system, and a detector circuit of a chosen impedance and phase angle is connected between their junction and earth, and wherein sensitivity to the principal types of symmetrical ground faults is achieved by virtue of the potential of the junction of the series impedances being vectorially displaced from the mean potential of the conductors.

In carrying the invention into effect, according to a first form, the monitor comprises a pair of impedances of equal magnitude but not alike in phase angle of current with respect to voltage across each impedance, connected in series between the conductors of the system, having a detector circuit connected between ground and the junction of the impedances, the potential of the junction being vectorially displaced from the mean potential of the conductors by an amount substantially equal to the half value of their potential difference.

In realizing an embodiment of the invention according to the first concept, the detector path includes a current sensing element in the form of a relay having a closing current which is a fraction of an arbitary low milliampere current tolerable by human tissue and presents an impedance connected between ground and the junction of a pair of unlike impedances which are connected in series across the conductors.

In carrying the invention into effect according to an alternative form, the monitor comprises a pair of like resistors connected in series between the conductors of the system having a detector circuit between their junction and earth, wherein the circuit includes an additional source of A.C. voltage in series between the junction and earth.

In realizing a specific embodiment of the invention in its alternative form, the detector circuit includes a winding between whose terminals an A.C. voltage is maintained, having a frequency differing by at least a few cycles per second from that of the conductors to be monitored, said winding being constituted, for example, as the rotor winding of a selsyn transformer having a fixed stator supplied by 3 phase voltage at line frequency and the rotor is arranged to be suitably rotated at a low rate of r.p.m., a current sensing element in the form of a relay having a closing current which is a fraction of an arbitrary low milliampere current tolerable by human tissue is included in series with the detector circuit and is arranged to give a current indication modified by an adjustable filter means to provide uniform sensitivity to possible faults of any configuration presenting the same hazard.

The invention may be the better understood with particular reference to the following description which is to be read in conjunction with the accompanying figures of drawing, wherein:

FIG. 1 is a schematic circuit diagram of one preferred embodiment of a ground monitor, employing resistance-capacitance conductor-bridging impedances and resistance-capacitance detector impedance;

FIG. 2 is a schematic diagram of an alternative form of a monitor circuit employing inductance-resistance and capacitance-resistance conductor bridging impedances;

FIG. 3 is a general schematic diagram showing a detector network and possible faulting impedances connected between each conductor and ground, for the analysis of detectors embodying the present invention;

FIG. 4 is a vector diagram of voltage relationships of elements forming the network of FIG. 1;

FIG. 5 is a vector diagram of voltage relationships of elements forming the network of FIG. 2;

FIG. 6 (a) to (k) are eleven configurations of possible faults to ground on a two-conductor system, referred to in the Table I accompanying the description;

FIG. 7 is a schematic diagram of a monitor having an additional A.C. voltage connected in the detector path;

FIG. 8 is an explanatory voltage vector diagram, relating to FIG. 7, showing the added voltage as a rotating vector;

FIG. 9 is an alternative monitor circuit having an oscillating vector voltage quantity in the detector path; and, FIG. 10 is a vector diagram related to FIG. 9.

In an ideal ungrounded electrical distribution system there is infinite impedance to ground. If a direct low resistance connection were to be made between any point of such system and ground no current would flow in the connector. A practical installation can only approach the ideal since insulation resistances are finite and even a very well insulated system exhibits finite capacitive impedances to ground. If a low impedance is connected between a point of a practical system and earth, a ground current will be observed to flow in the connection, the value depending on a number of parameters including the location of the connection. The magnitude of the maximum ground current which can be produced by deliberately choosing the worst location for a fault is a measure of the hazard of the system. Hereinafter, this current will be called the "Hazard Index" and may quantitatively be expressed in milliamperes. Any practical ungrounded installation can be considered as consisting of an ideal system of zero hazard index having one or more finite impedance faults to ground of various types.

Any practical ground detector electrically connected with a system will obviously introduce a finite impedance between the system and ground. When applied to an ideal ungrounded system it will raise the Hazard Index of the system from zero to a value which will be called the "Detector Hazard Index."

The "Total Hazard Index" of a practical isolated supply with ground detector connected is the sum of the hazard index of the fault impedances including inherent insulation resistance and capacitance, and the hazard index of the detector, the addition being carried out vectorially.

It is logically the safest course to specify the maximum Total Hazard Index tolerable, in milliamperes, above which maximum the monitor is required to give an alarm. Such index should in no event exceed about four milliamperes and should be preferably so low as not to be sensed by human tissue.

As a practical example of the hazards that may be associated with apparatus used in an operating room, for example, reference is made to the general impedance diagram of FIG. 3, wherein electrical supply conductors $a$ and $b$ are energized by a 120 volt 60 cycle A.C. source (not shown) and are isolated from ground $g$. A permanently connected monitor comprises impedances $Z_1$ and $Z_2$ in series across the conductors, and a branch impedance $Z_D$ including a current-responsive relay D connected between the junction $x$ and ground point $g$. Possible faults to ground between either conductor $a$ and $b$ and point $g$ are indicated in dotted outline as $Z_A$ and $Z_B$ respectively. A patient being operated on with an electrically powered surgical appliance, for example a bone saw, may at any time, due to failure of insulation of a conductor in the appliance at the potential of conductor $a$, have some body part presented as a low impedance connection $Z_C$ in parallel with $Z_A$ between conductor $a$ and ground $g$. The current that would flow in $Z_A$ and the body circuit would be the vector sum of the Detector Hazard Index and the Hazard Index due to the fault or faults $Z_B$ that may at any time occur or already be present but undetected on the system. Provided that any fault $Z_B$ on the system has a sufficiently high impedance no real danger to the patient is present. If the combined currents add up to more than a few milliamperes flowing in the body circuit, this would be an extremely dangerous situation with risk of shock or even electrocution of the patient. In the event that $Z_A$ and $Z_B$ are substantially alike, and if the monitor comprises equal series resistances $Z_1$ and $Z_2$, the detector D will not give an alarm. The total value of $Z_D$ in series with the parallel combination of $Z_1$ and $Z_2$ must be sufficiently high to limit the Detector Hazard Index to a safe value if $Z_A$ should be constituted as the sole path through body tissue.

In the event that symmetrical faults such as capacitors constitute $Z_A$ and $Z_B$, prior art resistance monitor circuits would fail to detect this condition; for in this situation:

$$Z_1 \equiv Z_2, \text{ and } \frac{Z_1}{Z_2} = \frac{Z_A}{Z_B}$$

whereby the potential of junction $x$ would equal that of point $g$.

Referring to FIGS. 1 and 4, one form of monitor circuit sensitive to both single and symmetrical faults comprises the impedances $R_1$ and $C_1$ connected in series across the supply conductors $a$ and $b$, with a branch impedance constituted as resistance $R_3$ and capacitor $C_2$ connected between $x$ and ground point $g$. The current-sensing element D may take any suitable form such as a transformer-rectifier assembly for deriving a low voltage, D.C., applied to a sensitive relay and/or milliammeter. It is to be understood that the impedance of the element is represented in $R_3$ and $C_2$. When $R_1$ and $C_1$ have equal magnitude, the vector relationships are as indicated in FIG. 4, with $EC_1$ representing voltage drop across the capacitor and $ER_1$ being the drop across $R_1$. Point $x$ has a potential represented by the junction of vectors $ER_1$ and $EC_1$, and lies on a circle of diameter $E_{ab}$, representing voltage across conductors $a$ and $b$.

Referring additionally to FIG. 6, the various fault configurations represented by schematics (a) to (k) are representative of possible and likely forms of impedance to ground $Z_A$ and $Z_B$. The shaded circular area of FIG. 4 defines the limits within which the potential of the ground point $g$ may be located relative to the potentials of conductors $a$ and $b$. Combinations of inductive and resistive faults in practice do not constitute probable or likely occurrences on distribution systems.

The combined impedance of $R_3$ and $C_2$ has a phase angle current preferably of 45 degrees leading the applied voltage. Such arrangement may be shown to provide equal sensitivity for single resistance or single capacitance faults on either conductor $a$ or $b$. In one typical practical embodiment, $R_1$ and $C_1$ had impedances at supply voltage of 60 cycles of 10 kilohms each, and the detector path had a combined impedance of magnitude 35 kilohms at a phase angle of 45 degrees leading. Element D was adjusted to close for a detector current of 0.5 milliampere A.C., providing a detection level for $Z_A$ or $Z_B$ as single faults of 136 kilohms. The monitor circuit serves for warning all fault configurations except the combination of FIG. 6 (g) for which the location of $g$ electrically falls close to $x$ in FIG. 4.

A modification of the monitor which provides a circuit sensitive to all configurations of faults shown in FIG. 6, is described with reference to FIGS. 2 and 5. In this embodiment $Z_1$ is constituted by $R_1$ and $L_1$ in series, $Z_2$ is constituted by $R_2$ and $C_1$ in series, and $Z_D$ is a resistance $R_3$, connected between junction $x$ and ground point g. Since $EZ_1$ has a lagging current while $EZ_2$ carries a leading current, the potential of the junction x of these vectors lies outside of the locus of g potentials due to capacitive-resistive fault combinations. Accordingly, there is no configuration for which both x and g coincide, hence detection of all types of fault is possible.

In one practical form in which the embodiment of FIG. 2 was sucessfully realized, $R_1$ and $L_1$ together had a combined impedance of 10 kilohms with phase angle of 60 degrees leading, while $R_2$ and $C_1$ had a combined impedance of 10 kilohms at a phase angle of 60 degrees lagging. $Z_D$ comprised a resistive impedance of 50 kilohms, and D was adjusted to provide an output signal for A.C. current greater than 0.5 milliampere in $Z_D$.

In contrast with a typical prior art detector wherein $Z_1$, $Z_2$ and $Z_D$ are resistances, the improved detectors may be shown to fulfill their monitoring function with fewer errors; as will be shown in the following Table I, with the embodiment of FIG. 2 wherein the shunt impedances $Z_1$ and $Z_2$ are unlike and have equal and opposite phase angles greater than 45 degrees, all probable and likely fault configurations are monitored. It should be observed that the fault configuration of FIG. 6(g) is safely detected while certain other configurations which are most probable and hazardous such as those of FIG. 6(c), (f), (h), and (k), are detected at enhanced sensitivity.

An embodiment of the invention wherein an additional source of voltage at a frequency differing from the line supply frequency is connected in series in the detector path is shown by FIG. 7. In this embodiment a pair of equal series resistors $R_1$ and $R_2$ are connected across the conductors a and b of a line to be monitored, whereby the potential of junction x is substantially the mean of that of the conductors. The vector relations appear in FIG. 8 wherein $E_{ab}$ represents the line voltage with x located at the midpoint.

In the absence of any detector, the relative potential of earth g with respect to conductors a and b may be located anywhere in a circular area of which $E_{ab}$ is a diameter, due to various configurations of faulting impedances that may become additionally connected from earth to line. The detector path is represented as including in series arrangement the winding SR having a voltage Eo between its terminals, an impedance $Z_3$, and an A.C. sensitive current detecting device D such as a milliammeter and/or relay, connected between junction point x and earthing point g. SR may preferably be realized as the rotor winding of a "Selsyn" transformer having a stator whose windings $ST_1$, $ST_2$, $ST_3$ are energized from respective phases of a three phase A.C. supply. For example, where a and b are energized by 60 cycle A.C. voltage, a block 13 consisting of an arrangement of impedances well known in the art may be employed to provide therefrom a simulated three phase supply, applied to the leads 10, 11, and 12 of the "Selsyn" stator. As will be directly apparent to those familiar with devices of this character, the rotor winding SR will have induced between its terminals, a voltage at the frequency of the supply having a constant magnitude and phase related to the mechanical angle assumed by the rotor with respect to a reference angular position. If the rotor is turned at a rate F, as by mechanical link including speed reducer 14 between the rotor shaft and a motor M which is suitably energized, the output voltage Eo will have a frequency:

$$60 \pm F$$

cycles per second, the sense of the sign depending on the direction of rotor rotation. By choosing F to be only a few cycles per second, and Eo to preferably have a value less than $E_{ab}$, the potentials of a and b with respect to ground in the absence of any fault will be observed to depend on the instantaneous position of the end of vector Eo, designated x', which rotates at F revolutions per second. This potential is directly measurable at the terminal x' of SR in FIG. 7 if the detector path be opened. By Thevenin's theorem, it may be shown that a detector current will be measured at some position of vector Eo for any configuration of fault impedances that may become connected to conductors a and/or b, and that the magnitude of the current will vary with the rate of rotation of this vector.

It is immaterial what means be used to provide the relative rotation of rotor SR relatively to its stator, provided that the rate be substantially constant. The motor drive may be unnecessary with certain types of Selsyn devices since the rotor may turn freely due to loading of the rotor winding. The detector D may be made responsive to peak current, average current, or other arbitrary modification of currents flowing in the detector circuit. Preferably, the detector is realized as a conventional D.C. responsive instrument fed by a low voltage pulsating D.C. obtained by rectifying the alternating current flowing in the circuit. Suitable adjustable resistance-capacitance filter means (not shown) of known type are associated with the rectifier unit to provide a D.C. current which has a value between the average current and the peak current of the pulsating D.C. In particular, the filter is so adjusted that for equal fault resistive impedances connected either to one conductor of the line or symmetrically to both, the indicator current is the same, to afford equal sensitivity to balanced or unbalanced faults. It will be readily understood that the time constant of such filter must be adjustable over a range including a period greater than a cycle of the difference frequency F.

In an alternative embodiment whose schematic circuit and vector diagrams are shown in FIGS. 9 and 10 the additional variable electrical quantity added to the potential of junction x is constant in frequency but varying in magnitude and sign at a rate F. The junction x of a pair of resistors $R_1$ and $R_2$ in FIGURE 9 is connected as in the previous embodiment of FIGURE 7 with the detector path wherein a winding SR has a voltage Eo appearing between its terminals x and x'. In this embodiment a single winding of the stator, $ST_1$, is energized at the line frequency at a constant phase difference of 90 degrees therewith, which may be produced by a phase shifter 13 interposed between the line and terminals 10 and 11 of one phase winding of the "Selsyn" transformer. The rotor SR is arranged to be rotated at a speed of a few revolutions per second from a speed reducer 14 connected with motor M, energized in any suitable manner.

The output of SR, when the transformation relation is such as to produce an R.M.S. value of voltage of 60 volts, may be written as follows:

$$Eo = 60\sqrt{2x} \; (\text{Sin } 2\pi Ft \times \text{Sin } 120\pi t) \text{ volts}$$

where F is the rate in revolutions per second at which SR is turned, and, the line frequency is 60 cycles per second. The vector relationship of Eo with respect to $E_{ab}$ is determined by the phase relationship of the supply voltage, which in this embodiment is connected to any one winding of the stator, with respect to line voltage ($E_{ab}$). Preferably, although not necessarily, Eo is made to oscillate at right angles to $E_{ab}$ by maintaining a phase relationship of 90 degrees.

Improved uniformity of detection levels in kilohms for various fault configurations is obtained by employing the static types of ground detectors described with reference to FIGS. 7 to 10 inclusive, wherein the mean A.C. potential of a junction of impedances across the line conductors is vectorially displaced from ground at a rate differing from the line frequency. The effectiveness of these embodiments will be apparent on inspecting typical measured values of detection levels listed under the headings of Table I, wherein the detector path is conditioned to read a "quasi-peak" current of equal indicated magnitude for the same type of single or balanced faults.

TABLE I

| Monitor Circuits, each with detector relays closing at 0.5 ma. A.C. | Ground Fault Configurations, According to FIGURE 6 of Drawing | | | | | | | | | | |
|---|---|---|---|---|---|---|---|---|---|---|---|
| | (a) | (b) | (c) | (d) | (e) | (f) | (g) | (h) | (i) | (j) | (k) |
| Fault Impedance Detection Levels in Kilohms: | | | | | | | | | | | |
| Prior art | 90 | 90 | 0 | 116 | 116 | 0 | 136 | 136 | 96 | 96 | 0 |
| FIG. 1 | 136 | 136 | 172 | 136 | 136 | 172 | 0 | 280 | 127 | 127 | 156 |
| FIG. 2 | 180 | 180 | 296 | 232 | 232 | 390 | 47 | 396 | 192 | 192 | 320 |
| FIGS. 7 or 9 | 140 | 140 | 140 | 140 | 140 | 140 | 180 | 180 | 127 | 127 | 120 |
| Maximum Undetected Fault Hazard Index, Milliamperes: | | | | | | | | | | | |
| Prior art | 1.3 | 1.3 | ∞ | 2.2 | 2.2 | ∞ | 2.9 | 2.9 | 3.0 | 3.0 | ∞ |
| FIG. 1 | 0.9 | 0.9 | 0.7 | 0.9 | 0.9 | 0.7 | ∞ | 0.4 | 0.9 | 0.9 | 0.8 |
| FIG. 2 | 0.7 | 0.7 | 0.4 | 0.5 | 0.5 | 0.3 | 2.5 | 0.3 | 0.6 | 0.6 | 0.4 |
| FIGS. 7 or 9 | 0.85 | 0.85 | 0.85 | 0.85 | 0.85 | 0.85 | 0.65 | 0.65 | 0.95 | 0.95 | 1.0 |
| Maximum Undetected Total Hazard Index in Milliamperes: | | | | | | | | | | | |
| Prior art | 3.3 | 3.3 | ∞ | 2.2 | 2.2 | ∞ | 2.9 | 2.9 | 3.0 | 3.0 | ∞ |
| FIG. 1 | 2.2 | 2.9 | 2.7 | 2.9 | 2.2 | 2.7 | ∞ | 2.1 | 2.7 | 2.7 | 2.6 |
| FIG. 2 | 2.4 | 2.4 | 2.2 | 2.4 | 2.0 | 2.3 | 4.4 | 2.2 | 2.6 | 2.0 | 2.4 |
| FIGS. 7 or 9 | 2.7 | 2.7 | 2.7 | 2.7 | 2.7 | 2.7 | 2.5 | 2.5 | 2.95 | 2.95 | 3.0 |

While the foregoing specification has particularly described monitor circuits for practical supply distribution systems designed with regard to protecting human safety, it lies within the scope of the invention by altering the magnitudes and types of impedances of these circuits to provide for giving a warning for any desired detection level and for limiting the detector current as may be desired.

We claim:

1. Apparatus for detecting connection of impedances between ground and a pair of alternating current distribution conductors energizable from a source and normally isolated from ground, comprising first and second linear impedance means each having a terminal connected to respective conductors and a common junction for their other terminals, a branch path connected between said junction and ground and comprising a third impedance whereby said conductors normally have a mean potential substantially that of ground, alternating current responsive means connected in series in said path, and means energizing said first and second impedance means effective to vectorially displace the potential of said junction from said mean potential.

2. Apparatus as in claim 1 wherein said first and said second impedance means are of equal magnitude.

3. Monitor apparatus for indicating ground faults on an alternating current distribution line whose conductors are normally connected to a source isolated from ground by large impedances to fix their mean potential substantially at ground potential, comprising first and second linear impedance means of substantially equal magnitude connected in series between said conductors, a branch circuit having a third impedance connected between the junction of said impedances and ground, means energizing said impedances and said circuit effective to vectorially displace the potential of said junction from said mean potential, and alternating current responsive indicating means in series in said branch circuit.

4. Apparatus as in claim 3 wherein said first and said second impedance means are respectively a resistance and a capacitance and said means for energizing said impedances comprises said source.

5. Apparatus as in claim 3 wherein said first and said second impedances respectively comprise an inductive element and a capacitive element each having resistive impedance components, and said energizing means comprises said source and the phase angles of the voltages across the first and second impedance means are equal in magnitude and opposite in sign and greater than 45 degrees but less than 90 degrees with respect to the current through said impedances.

6. Apparatus as in claim 5 wherein the phase angles of voltage and current in said first and second impedances are substantially displaced by 120 degrees with respect to each other.

7. Apparatus as in claim 3 wherein said first and said second impedance means comprise equal resistances and said energizing means comprises a second source of voltage having a frequency differing from that of the line conductors, connected in series in said branch circuit.

8. Apparatus as in claim 3 wherein said first and said second impedances are resistances and said energizing means comprises a second source of voltage in series with said branch circuit having a frequency different from that of the line frequency by an amount in the range from about one cycle per second to about 30 cycles per second, and having an R.M.S. magnitude in the range from about one tenth to about twice the voltage of said first source.

9. Apparatus as in claim 3 wherein said first and second impedances are equal resistances and said energizing means comprises a rotor winding of a selsyn transformer having three phase stator windings, and including means to energize said phase windings by three phase voltages at line frequency, motor means adapted to rotate said rotor, and means to connect said rotor in series in said branch circuit, whereby said rotor winding has developed across its terminals a voltage having a frequency differing from the source frequency by an incremental frequency corresponding with the rate of rotation of said rotor.

10. Apparatus as in claim 3 wherein said first and said second impedances are resistances of equal magnitude and said energizing means comprises the rotor winding of a selsyn transformer having a delta-connected phase-wound stator, to one winding of which is applied voltage at the frequency of said source and displaced in phase angle by 90 degrees therefrom, said rotor winding being in series in said branch circuit, and drive means for rotating said rotor are mechanically coupled therewith for rotating the rotor at a frequency which is less than said line frequency.

11. Apparatus as in claim 3 wherein said first and said second impedance means comprise equal resistances and said energizing means comprises a second source of voltage having a frequency the same as the source connected to the line conductors, connected in series in said branch path.

References Cited in the file of this patent

UNITED STATES PATENTS

| | | |
|---|---|---|
| 1,994,589 | O'Hagan | Mar. 19, 1935 |
| 2,022,758 | Corderman | Dec. 3, 1935 |
| 2,660,717 | Hood | Nov. 24, 1953 |